(12) United States Patent
Fiorello

(10) Patent No.: US 11,724,784 B2
(45) Date of Patent: Aug. 15, 2023

(54) SUBMERSIBLE DRONE DEVICES AND SYSTEMS

(71) Applicant: GOOCH'S BEACH DRONE COMPANY, Palm Beach Gardens, FL (US)

(72) Inventor: Daniel Justin Fiorello, Palm Beach Gardens, FL (US)

(73) Assignee: GOOCH'S BEACH DRONE COMPANY, Palm Beach Gardens, FL (US)

( * ) Notice: Subject to any disclaimer, the term of this patent is extended or adjusted under 35 U.S.C. 154(b) by 215 days.

(21) Appl. No.: 17/360,978

(22) Filed: Jun. 28, 2021

(65) Prior Publication Data
US 2021/0323646 A1 Oct. 21, 2021

Related U.S. Application Data

(63) Continuation of application No. 16/110,871, filed on Aug. 23, 2018, now Pat. No. 11,046,401.

(60) Provisional application No. 62/551,661, filed on Aug. 29, 2017.

(51) Int. Cl.
| | |
|---|---|
| *A01K 74/00* | (2006.01) |
| *B63G 8/08* | (2006.01) |
| *B63G 8/00* | (2006.01) |
| *A01K 69/08* | (2006.01) |
| *B63G 8/22* | (2006.01) |

(52) U.S. Cl.
CPC .............. *B63G 8/001* (2013.01); *A01K 69/08* (2013.01); *B63G 8/08* (2013.01); *B63G 8/22* (2013.01); *A01K 74/00* (2013.01); *B63G 2008/004* (2013.01)

(58) Field of Classification Search
CPC ........ A01K 61/80; A01K 61/95; A01K 73/00; A01K 74/00; A01K 75/00; A01K 79/00; A01K 61/70; A01K 69/00; A01K 69/06; A01K 69/08; A01K 63/00; B63G 8/08; B63G 2008/004; B63G 2008/005; B63G 8/06; B63G 8/001; B63G 8/22
See application file for complete search history.

(56) References Cited

U.S. PATENT DOCUMENTS

| | | |
|---|---|---|
| 7,320,289 B1 | 1/2008 | Clarke |
| 8,881,682 B2 | 11/2014 | Thorvardarson |
| 9,655,347 B2 | 5/2017 | Troy |
| 10,099,759 B1 | 10/2018 | Mehta |
| 10,191,489 B1 | 1/2019 | Rapoport |
| 10,599,922 B2 | 3/2020 | James |
| 2006/0112610 A1 | 6/2006 | Philbrook |
| 2009/0235870 A1 | 9/2009 | Troy |
| 2013/0206915 A1 | 8/2013 | Desaulniers |
| 2016/0376000 A1 | 12/2016 | Kohstall |
| 2018/0132459 A1 | 5/2018 | Baba |

(Continued)

FOREIGN PATENT DOCUMENTS

| | | |
|---|---|---|
| GB | 2178932 A | 2/1987 |
| WO | 2017042785 A1 | 3/2017 |

*Primary Examiner* — Yvonne R Abbott-Lewis
(74) *Attorney, Agent, or Firm* — Daniel J. Fiorello

(57) ABSTRACT

In accordance with at least one aspect of this disclosure, a crustacean trap can include a cage configured to trap one or more crustaceans, and a propulsion system connected to the cage and configured to provide propulsion to the cage. In certain embodiments, the trap can include a controller configured to control the propulsion system to autonomously pilot the trap.

20 Claims, 12 Drawing Sheets

(56) References Cited

U.S. PATENT DOCUMENTS

| | | |
|---|---|---|
| 2018/0154995 A1 | 6/2018 | Cole |
| 2018/0160658 A1 | 6/2018 | Lyngoy |
| 2020/0291630 A1 | 9/2020 | Raddon |

SUBMERSIBLE DRONE DEVICES AND SYSTEMS

CROSS-REFERENCE TO RELATED APPLICATIONS

This application is a continuation of U.S. Non-Provisional patent application Ser. No. 16/110,871, filed Aug. 23, 2018, which claims priority to and the benefit of U.S. Provisional Application No. 62/551,661, filed Aug. 29, 2017, the contents of which are herein incorporated by reference in their entirety.

BACKGROUND

1. Field

The present disclosure relates to drones, more specifically to drones for underwater use.

2. Description of Related Art

Certain industries rely on sourcing or recovering things from the sea. For example, the lobstering and crabbing industries uses specifically designed cages that are dropped to the bottom of the ocean to trap lobsters. The cages are attached to buoys and can be found and recovered at a later date by a lobstering or crabbing boat. However, the cost to operate the boat and the limitations of protecting and recovering the cages/buoys from theft, bad weather, or the like, are the primary source of cost in the crabbing and lobstering industry.

Such conventional methods and systems have generally been considered satisfactory for their intended purpose. However, there is still a need in the art for improved methods and systems that can allow retrieval of underwater items (e.g., lobster cages). The present disclosure provides a solution for this need.

SUMMARY

In accordance with at least one aspect of this disclosure, a crustacean trap can include a cage configured to trap one or more crustaceans, and a propulsion system connected to the cage and configured to provide propulsion to the cage. In certain embodiments, the trap can include a controller configured to control the propulsion system to autonomously pilot the trap.

The propulsion system can include at least one rotor connected to the cage. The propulsion system can include at least one propeller connected to the cage. The propulsion system can include three or more (e.g. four) rotors positioned, e.g., to provide 3-axis control to at least provide directional and/or orientation control in motion.

The propulsion system can include at least one electric motor connected to each rotor and/or propeller, at least one battery can be electrically connected to the at least one electric motor, and wherein the controller can be configured to control each electric motor to control each rotor and/or propeller independent of the other rotors and/or propellers.

In certain embodiments, a thrust vector can moveable relative to the cage (e.g., by having one or more moveable propellers or a moveable outlet manifold of at least one propeller). The controller can be configured to control a direction of the thrust vector of to provide a directional control of the trap. In certain embodiments, the trap can further include at least one hydrodynamic surface (e.g., a moveable rudder, a wing) connected to the cage and configured to provide at least directional control in motion.

The trap can include an inflatable ballast system connected to the cage and configured to provide lifting force to the trap under water. The controller can be configured to control the propulsion system and the inflatable ballast system to autonomously pilot the trap.

The inflatable ballast system can include at least one pressure vessel, at least one gas supply, and at least one valve operatively connected to the controller and configured to permit gas from the gas supply into the pressure vessel in an open position, and to prevent gas from the gas supply from entering the pressure vessel in a closed position.

The controller can be configured to control the at least one valve to allow enough gas into the pressure vessel to provide a predetermined lifting force. The controller can be configured to control the at least one valve to allow enough gas to create equal lifting force to the weight of the trap to create a zero weight condition under water or to create greater lifting force then the weight of the trap to cause the trap to rise.

In certain embodiments, the trap can include a compressor configured to recompress gas in the pressure vessel back into the gas supply. The trap can include one or more release valves configured to release gas from the pressure vessel into the atmosphere and/or to flood the pressure vessel with water.

In certain embodiments, at least one state sensor can be operatively disposed on the trap in communication with the controller and configured to determine at least one state of the trap. The at least one state sensor can include at least one of a position sensor, a speed sensor, an attitude sensor, a roll sensor, a yaw sensor, a pitch sensor, an altimeter (e.g., a static pressure sensor), or an accelerometer (e.g., an inertial measurement unit).

The controller can be configured to receive signals from the at least one state sensor and to control the propulsion system and/or the ballast system a function of the received signals from the at least one state sensor.

In accordance with at least one aspect of this disclosure, a method can include harvesting crustaceans using at least one drone or at least one drone crustacean trap. Harvesting can include autonomously harvesting crustaceans, for example (by using one or more autonomous drones or drone traps as disclosed herein). The method can include receiving the at least one drone or a drone crustacean trap at a water side land based location for processing of the drone or drone crustacean trap.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
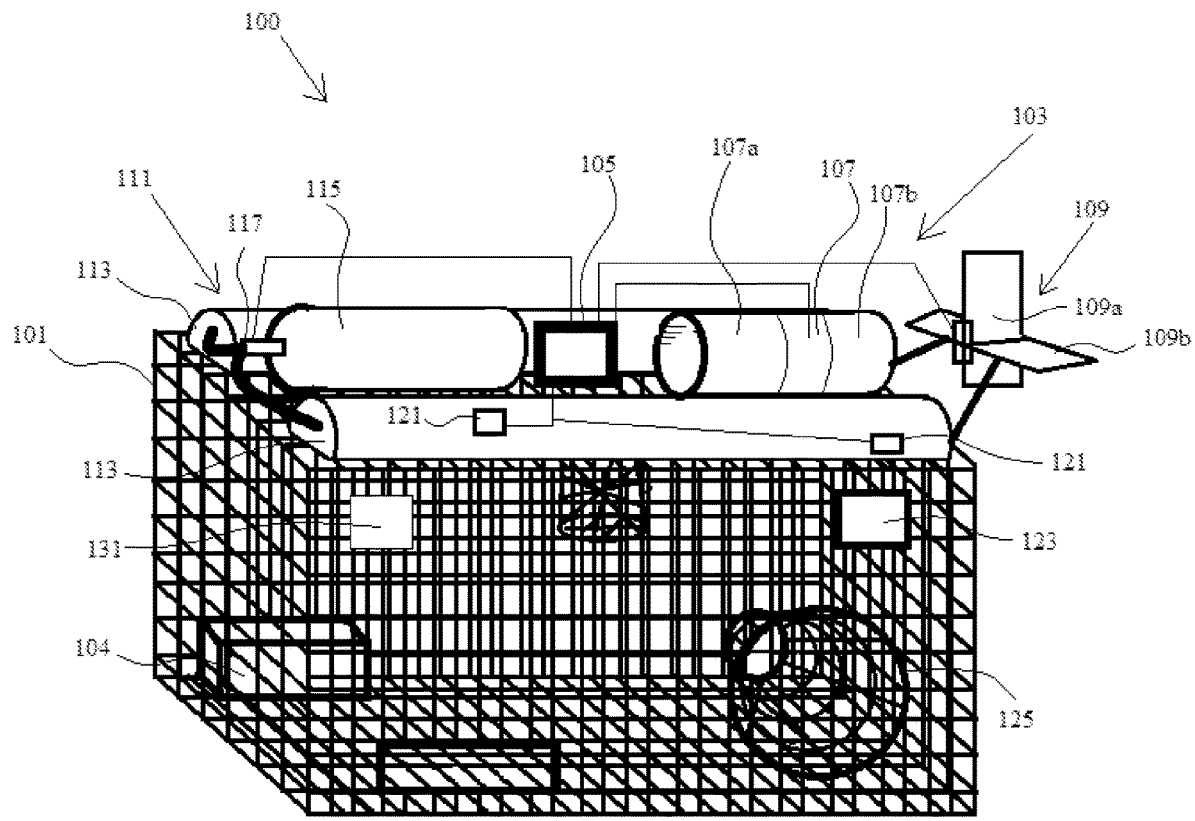
FIG. 1A is a perspective view of an embodiment of a trap in accordance with this disclosure.
Figure 1B:
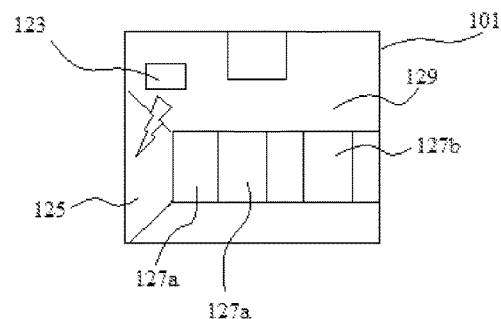
FIG. 1B is a schematic cross-sectional view of an exit pathway and door system in accordance with this disclosure.

Reference will now be made to the drawings wherein like reference numerals identify similar structural features or aspects of the subject disclosure. For purposes of explanation and illustration, and not limitation, an illustrative view of an embodiment of a trap in accordance with the disclosure is shown in FIG. 1A. Other embodiments and/or aspects of this disclosure are shown in FIGS. 1B-9. The systems, devices, and methods described herein can be used to, e.g., reduce the cost to crustacean fishing industries and improve the efficiency of crustacean trapping and retrieval, for example.

Referring generally to FIG. 1, in accordance with at least one aspect of this disclosure, a drone (autonomously or manually controlled) crustacean trap 100 can include a cage 101 configured to trap one or more crustaceans. The trap 100 can include a propulsion system 103 connected to the cage 101 and configured to provide propulsion to the cage 101. The trap 100 can include a controller 105 configured to control the propulsion system 103 to autonomously pilot the trap 100. The controller 105 can include any suitable hardware and/or software module(s) configured to operate a trap and/or drone as disclosed herein (e.g., to pilot the trap/drone, and/or to operate one or more smart sensors, to perform state calculations, to receive and/or send signals using a transmission system as disclosed herein).

In certain embodiments, the propulsion system 103 includes at least one propeller 107 connected to the cage (e.g., configured primarily for horizontal propulsion). The at least one propeller can be any suitable propeller type (e.g., an enclosed impeller as shown having an intake manifold 107a extending from the cage to open in a direction away from the cage). In certain embodiments, the propulsion system 103 can include at least one electric motor (not specifically shown) connected to one or more of the at least one propeller 107 and at least one battery 104 electrically connected to at least one of the at least one electric motor. Any other suitable motor type (e.g., a fuel powered engine) is contemplated herein for at least one of the at least one propeller 107.

The intake manifold 107a and/or output manifold 107b can include any suitable grating to prevent debris (e.g., sea weed, fish, etc.) from entering into the propeller 107. The intake manifold 107a and the output manifold 107b can include any suitable shape (e.g., cylindrical as shown, an s-duct shape, etc.).

The trap 100 can include one or more batteries 104 of any suitable type (e.g., lithium-ion). The one or more batteries 104 can be selected for the temperature and pressure characteristics intended for use. In certain embodiments, the one or more batteries 104 can be sized and positioned to be placed in a cage 101 where weights would traditionally be placed (e.g., at the four corners as in a commercial lobster cage). Any suitable location and means to connect the one or more batteries 104 is contemplated herein. In certain embodiments, it is contemplated that the cage 101 can be made of metal bars (e.g., as in traditional commercial pots). It is contemplated that cage 101 can be designed to use one or more of the metal bars as isolated electrical pathways (e.g., to supply power the one or more propeller 107 and/or the at least one controller 105, and/or the at least one valves 117, 121 described below, and/or the at least one hydrodynamic surface 109 described below, and/or any other suitable system).

In certain embodiments, the trap 100 can further include at least one hydrodynamic surface 109 (e.g., a rudder 109a, an elevator 109b, an aileron) connected to the cage 101 (and/or the propeller 107 or manifold thereof) and configured to provide at least directional control in motion. For example, the trap 100 can include a rudder 109a and an elevator 109b (e.g., positioned downstream of the propeller 107, e.g., to enhance propwash forces).

In certain embodiments, a thrust vector can moveable relative to the cage. For example, the one or more moveable propellers 107 can be mounted to be movable, or an outlet manifold 107b of at least one propeller 107 can be movable (e.g., similar to a jetski). The controller 105 can be configured to control a direction of the thrust vector (e.g., by controlling the rudder, elevator, propeller position, or outtake manifold position) to provide a directional control of the trap 100.

In certain embodiments, the trap 100 can include an inflatable ballast system 111 connected to the cage 101 and configured to provide lifting force to the trap 100 under water. In certain embodiments, the inflatable ballast system 111 can include at least one pressure vessel 113 (e.g., a solid tank as shown or a flexible bladder) and at least one gas supply 115. The pressure vessel 113 can be any suitable size, shape, and/or internal volume configured to retain and suitable amount of gas to provide any suitable lifting force (e.g., about three cubic feet or more to lift several hundred pounds). The inflatable ballast system 111 can also include at least one valve 117 configured to permit gas from the gas supply 115 into the at least one pressure vessel 113 in an open position, and to prevent gas from the gas supply 115 from entering the pressure vessel 113 in a closed position.

The at least one valve 117 can be operatively connected to the controller 105 as shown. In certain embodiments, multiple valves 117 per gas supply 115 can be used to isolate different pressure vessels 113, for example.

The controller 105 can be configured to control the at least one valve 117 to allow enough gas into the pressure vessel 113 to provide a predetermined lifting force, for example. In certain embodiments, the controller 105 can be configured to control the at least one valve 117 to allow enough gas to create equal lifting force to the weight of the trap 100 to create a zero weight condition under water. In certain embodiments, the controller 105 can be configured to control the at least one valve 117 to allow enough gas to create greater lifting force then the weight of the trap 100 to cause the trap 100 to rise. The controller 105 can be configured to control the altitude of the trap 100 at least partly using the at least one pressure vessel 113 and one or more state sensors (e.g., a static pressure sensor) to use feedback from the one or more state sensors to control the inflation of the at least one pressure vessel 113 (e.g., to allow the trap 100 to rise or sink as desired).

The gas in the at least one gas supply 115 can be compressed air or any other suitable gas (e.g., $CO_2$). The at least one gas supply 115 can include at least one tank that holds between about 0.5 cubic feet and about 5 cubic feet of gas at STP, for example. Any other suitable size tank or number of tanks is contemplated herein (e.g., suitably large to at least negate or lift the weight of a full lobster cage). In certain embodiments, the trap 100 can include a compressor (not shown) configured to recompress gas in the at least one pressure vessel 113 back into the gas supply 115.

In certain embodiments, the trap 100 can include one or more release valves 121 disposed on the at least one pressure vessel 113 configured to release gas from the at least one pressure vessel 113 into the atmosphere and/or to flood the at least one pressure vessel 113 with water. The one or more release valves 121 can also allow water to be pushed out when the respective pressure vessel 121 is being filled with gas. In certain embodiments, each pressure vessel 113 may include a plurality of release valves 121 as shown, e.g., one or more to vent a gas, and one or more to allow inflow and/or outflow of water in the respective pressure vessel 113. Any suitable number, position, type (e.g., check valve, actuated electromechanical valve), and or function of valves 121 is contemplated herein.

The at least one pressure vessel 113 can be sized and/or positioned to cause the trap 100 to be in a predetermined attitude when inflated under water to allow the propulsion system 103 to maintain 3-axis control. For example, the at least one pressure vessel 113 can keep the trap 100 in a horizontal position when inflated. In embodiments with a plurality of pressure vessels 113, the controller 105 can be configured to inflate the plurality of pressure vessels 113 differently (e.g., based on weighting of the trap 100 in its current state) to provide a desired orientation of the trap 100 (e.g., horizontal). While the embodiment shown in FIG. 1A only shows two pressure vessels 113 connected to the cage 101, it is contemplated that three or more pressure vessels of any suitable shape and/or size can be utilized and positioned in any suitable manner to allow 3-axis orientation control by inflating each pressure vessel to an amount to produce a net force such that the trap 100 is positioned in a desired manner (e.g., pitch up, pitch down, horizontal, etc.).

In certain embodiments, a ballast system 111 wherein one or more pressure vessels 113 are located at a perimeter of the cage 101 can be used. A perimeter ballast system can be used to more easily control the orientation of the trap 100 by distributing the force over a wider area. As disclosed above, in certain embodiments, each portion (e.g., three or more pressure vessels) of the ballast system 111 can be fluidly isolated so that the orientation of the trap can be controlled with the ballast system. In certain embodiment, a single propeller 107 can be used to provide thrust without a hydrodynamic surface 109, and the ballast system 111 can be used to steer the trap 100. Any other suitable configuration is contemplated herein.

In certain embodiments, at least one state sensor 123 can be operatively disposed on (e.g., meaning on or within in any suitable manner) the trap 100 in communication with the controller 105 and configured to determine at least one state of the trap 100 and/or one or more animals entering or within the cage 101. One or more state sensors 123 can be integrated with the controller 105, and/or separate from the controller 105 in any suitable manner. One or more state sensors 123 can be in communication with the controller 105 to provide signals/data to the controller 105. In certain embodiments, the one or more state sensors 123 can be self-contained systems that include processing logic for making determinations and can provide such determinations to the controller 105 to be utilized by the controller logic in any suitable manner. The at least one state sensor 123 can include and/or be embodiment in any suitable hardware and/or software modules, as appreciated by those having ordinary skill in the art in view of this disclosure. Any structure and/or relationship with the controller 105 to perform the desired function is contemplated herein.

The at least one state sensor 123 can include at least one of a position sensor (e.g., a GPS unit or any other suitable location sensor), a speed sensor, an attitude sensor, a roll sensor, a yaw sensor, a pitch sensor, an altimeter (e.g., a static pressure sensor) or an accelerometer for determining at least one of a location, attitude, and/or movement of the trap 100. Any other suitable state sensor(s) is contemplated herein. For example, in certain embodiments, the trap can include an inertial measurement unit (for estimating position underwater) and/or a GPS (e.g., for use at or near the surface of the water, and/or as part of a deployable buoy, e.g., which can periodically correct IMU error) for determining location of the trap 100. In certain embodiments, the controller 105 can receive signals from the at least one state sensor 123 and determine the orientation of the trap 100 when at rest, and to operate the propulsion system 103 and/or ballast system 111 to reposition the trap 100 (e.g., to a substantially flat spot) when in an undesired orientation (e.g., on a severe slope).

In certain embodiments, the at least one state sensor 123 can include at least one of a sonar device or an electromagnetic device (e.g., configured for interrogation of local surroundings to avoid hitting obstacles and/or finding landing spots). For example, the at least one state sensor 123 can include at least one suitable emitter (e.g., a light emitter, an acoustic emitter of any suitable frequency) and at least one receiver for receiving reflected emissions for interrogating the environment for example. The electromagnetic device can include radar, LIDAR, a camera, or any other suitable device for detecting and/or mapping surroundings. The sonar device can include an echo location system for example.

In certain embodiments, the at least one state sensor 123 can be configured to sense and/or determine an amount, size, weight, and/or one or more attributes (e.g., pregnancy of crustacean, whether there is shell disease) of one or more animals (e.g., lobsters, crabs) trapped within or in proximity to the cage 101. The controller 105 can be configured to receive signals from the at least one sensor 123 and to control the propulsion system 103 and/or the ballast system 113 as a function of the received signals from the at least one sensor 123. For example, the controller 105 can determine based on data from the at least one sensor 123 that the trap is sufficiently full and that the trap 100 can lift off and travel back to a predetermined location for collection.

In certain embodiments, the trap 100 can be configured to reject and/or eject a crustacean based on size or pregnancy. For example, the at least one state sensor 123 can include an infrared, visual, or other light based system and/or an ultrasonic system for detecting a shape, dimensions, shell features, or any other suitable physical characteristic of a crustacean. The controller 105 can receive this data and determine the physical characteristics. For example, referring to FIG. 1B, the trap 100 can include an exit pathway 127a and door 127b at each entrance 125. The controller 105 can operate the exit door 127b to open to the outside of the cage 101 to guide a crustacean out of the trap 100 if it is determined to be, e.g., too small, or pregnant, or with shell disease, before being permanently trapped or otherwise directed to a main trap area 129. In certain embodiments, the controller 105 can be configured to operate a main trap door 127c to open to allow the crustacean to enter the main cage 101. Any other suitable means to prevent capture of underage or pregnant crustaceans is contemplated herein.

The state sensor 123 can include an imaging device (e.g., a video camera, a sonar imager, an IR imager) configured to provide video for local recording or for transmission to a user in real time via the communication system in any suitable manner.

In certain embodiments, the trap 100 can include at least one deployable buoy (e.g., as shown in FIG. 7) connected to the trap with a line (e.g., a rope and/or a data cable). In certain embodiments, at least one location sensor (e.g., a GPS sensor) can be attached to the at least one buoy to deploy the location sensor to the surface (e.g., in a lost state or in any other suitable circumstance or for any other suitable reason).

In certain embodiments, the trap 100 can include at least one generator (not shown) to generate electricity (e.g., a turbine that floats above the trap and generates electricity from water current) and charge the one or more batteries 104. The generator can be connected to the trap 100 with a suitable line and can include any suitable structure, and can be selectively deployable. It is contemplated that one or more rotors and/or propellers can additionally or alternatively be allowed to generate electricity in reverse operation when the trap 100 is stationary and water current flows through.

The trap 100 can include at least one communication system 131, e.g., configured to send and/or receive signals from/to the trap 100 and/or to send and/or receive signals from/to a navigation system (e.g., any suitable underwater navigation system). In certain embodiments, the trap 100 can include at least one deployable buoy (e.g., as shown in FIG. 7) connected to the trap with a line and configured to deploy the transmission system to the surface (e.g., for remote communication and/or for finding a broken drone trap). The communication system can include at least one of a sonar system or an electromagnetic system (e.g., radio, microwave, etc.) for example.

For example, the controller 105 can be connected to the communication system and configured to process received sonar signals from an underwater navigation system (e.g., as described below) and to determine a position of the trap 100 underwater as a function at least one of range from one or more buoys of the underwater navigation system. The controller 105 can be configured to triangulate the position of the trap from a received signal from a plurality of buoys of the underwater navigation system. In certain embodiments, a user can manually control the operation of the propulsion system 103 and/or the ballast system 111 through the communication system (e.g., using the underwater navigation system buoys to transmit live feed data and/or video using a sonar data signal, as appreciated by those having ordinary skill in the art in view of this disclosure).

Figure 1C:
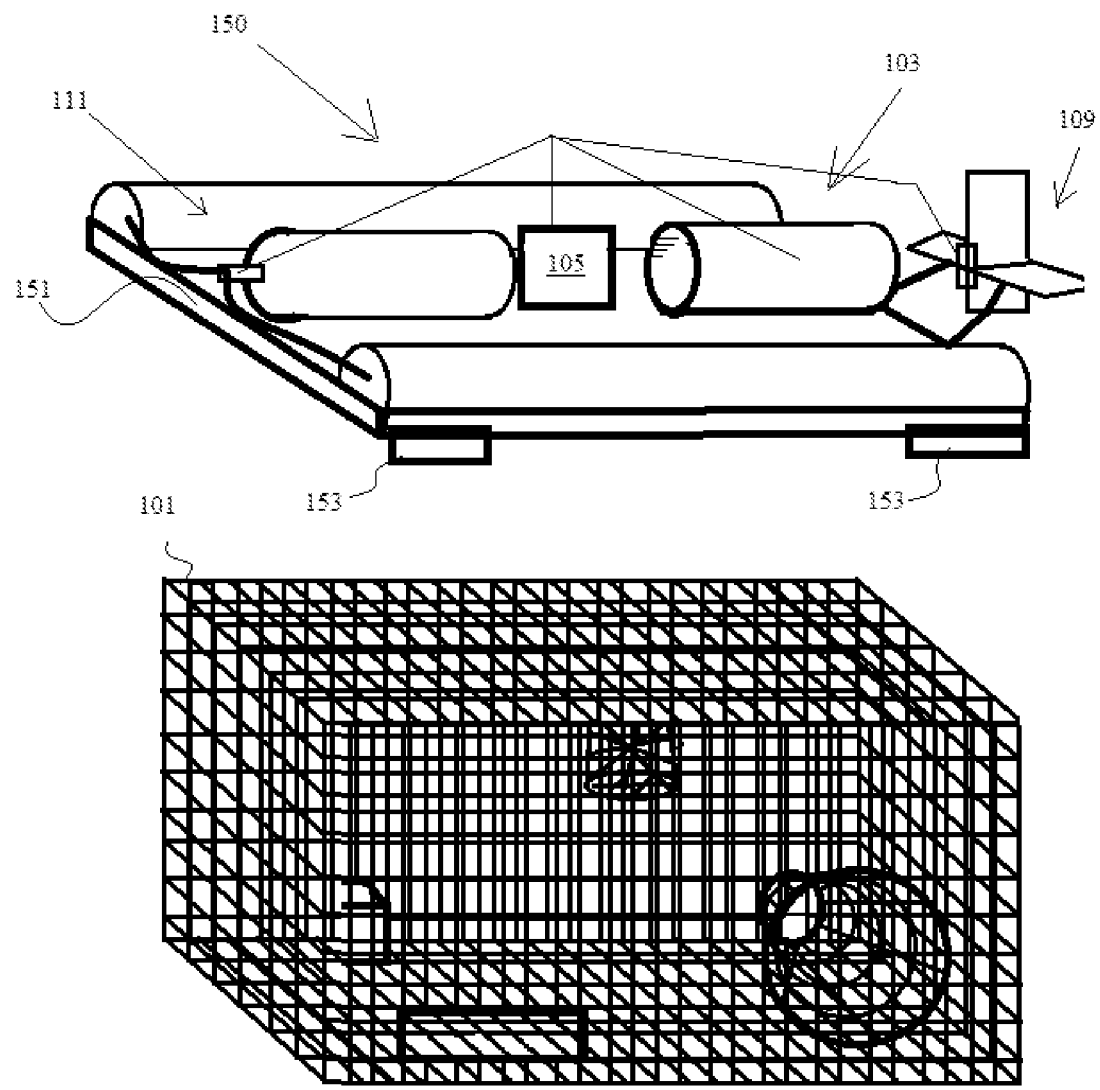
FIG. 1C is a perspective view of an embodiment of a drone in accordance with this disclosure that includes a structure that is configured to attached to a cage.

Referring to FIG. 1C, an embodiment of a drone 150 is shown above a cage 101. The drone 150 can include a frame 151 to which at least some components can be mounted. The drone 150 can include any and/or all components of any suitable embodiment of a trap disclosed herein (e.g., above or below) without being integrated to the cage 101. For example, the drone 150 can include a propulsion system 103, a ballast system 111, a controller 105, and/or a hydrodynamic surface 109 connected to the frame 151. The drone 150 can be selectively attached to the cage 101 (e.g., useful for retro fit and/or replacement) using, e.g., one or more clamps 153 configured to attach to the cage 101. It is contemplated that the frame 151 can encase or be formed from any suitable components (e.g., one or more batteries 104). The frame 151 can include any suitable shape (e.g., a planar shape as shown).

Figure 2:
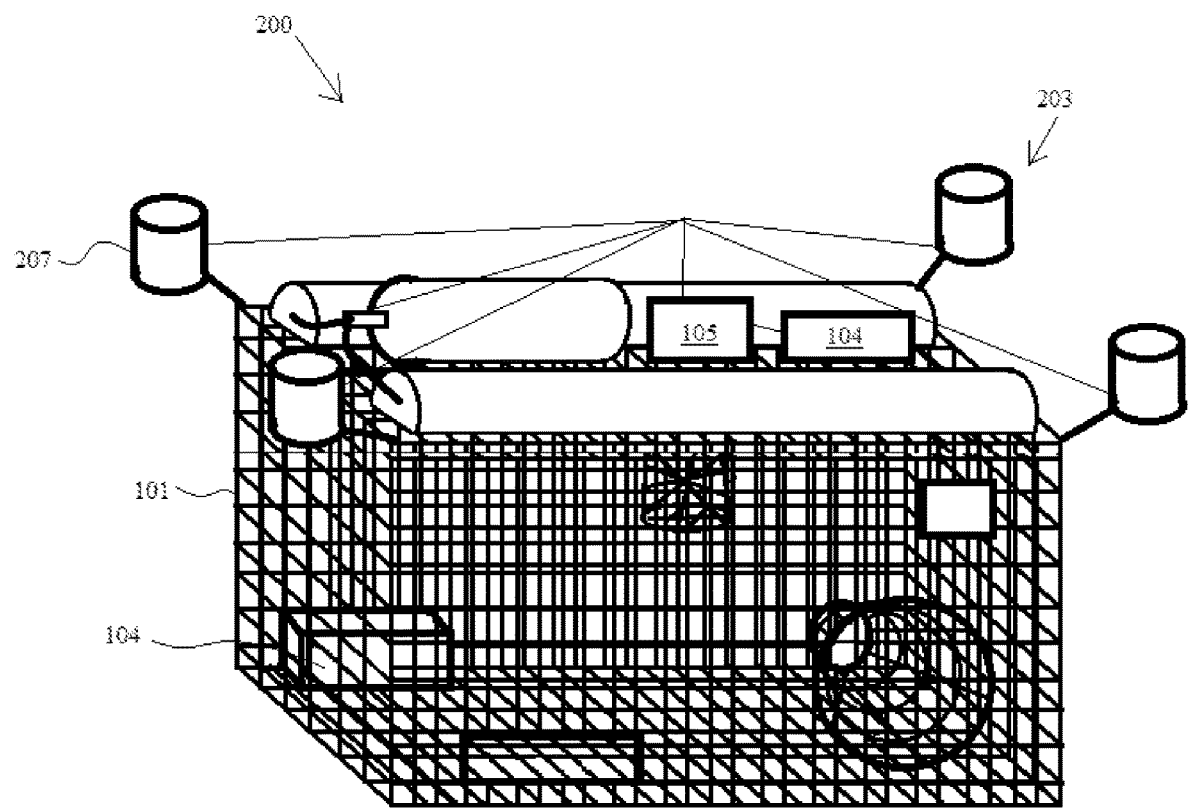
FIG. 2 is a perspective view of an embodiment of a trap in accordance with this disclosure, showing a ballast system and a propulsion system having a quad rotor arrangement.

Referring to FIG. 2, another embodiment of a trap 200 is shown. The trap 200 can include any and/or all components of trap 100 disclosed above. Additionally, or alternatively to the ballast system 111 and/or the propeller 107, the propulsion system 203 can include at least one rotor 207 connected to the cage 101. The at least one rotor 207 can include any suitable rotor type (e.g., an impeller type propulsion system).

The propulsion system 203 can include three or more rotors 207 positioned configured to provide at least direction and/or orientation control during motion of the trap 200 (e.g., to provide 3-axis control). For example, the propulsion system 203 can include four rotors (e.g., as shown, similar to a quad copter).

In certain embodiments, the propulsion system 203 can include at least one electric motor (not specifically shown) connected to each rotor 207 at least one battery 104, e.g., as described above, electrically connected to at least one of the at least one electric motor. The controller 105 can be configured to control each electric motor to control each rotor 207 independent of the other rotors 207. For example, the controller 105 can be configured to control a speed of each electric motor. The controller 105 can be configured to control the rotors 207 as a function the at least one state sensor 123, similar as described above (e.g., using sensed orientation, altitude, position, etc.). Any suitable control scheme is contemplated herein. As disclosed above, any and/or all components of the trap 200 can be included on a separate drone, e.g., integrated on a frame attachable to a cage, e.g., similar as shown in FIG. 1C, and need not be integrated with the cage 101.

While certain embodiments have been disclosed above, any suitable propulsion system and/or control system is contemplated herein to provide one or more of lifting force (primary or supplemental), orientation control, and/or directional control during motion of the trap.

In accordance with at least one aspect of this disclosure, a crustacean trap can include a cage configured to trap crustaceans, and an inflatable ballast system (with or without a propulsion system) connected to the cage and configured to provide lifting force to the cage under water. In certain embodiments, the trap can include a propulsion system configured to provide thrust to the cage.

In accordance with at least one aspect of this disclosure, a crustacean trap can include a cage configured to trap crustacean, and at least one state sensing system connected to the cage and configured to determine a state of the cage and/or of an animal trapped within or in proximity of the cage (this embodiment with or without a propulsion or ballast system). The state sensing system can include at least one state sensor as described herein and/or any other sensors suitable for their intended purpose as appreciated by those having ordinary skill in the art. The state sensing system can include any suitable computer hardware and/or software modules (e.g., integrated into a controller) for processing signals and/or data from the one or more sensors to perform any suitable function.

The trap can include at least one communication system as described herein, or any other suitable communication system. For example, the communication system can include at least one of a sonar system or an electromagnetic system.

Figure 3:
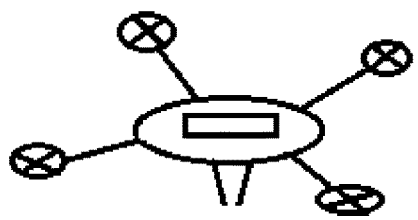
FIG. 3 is a perspective view of an embodiment of a submersible drone in accordance with this disclosure.
Figure 4:
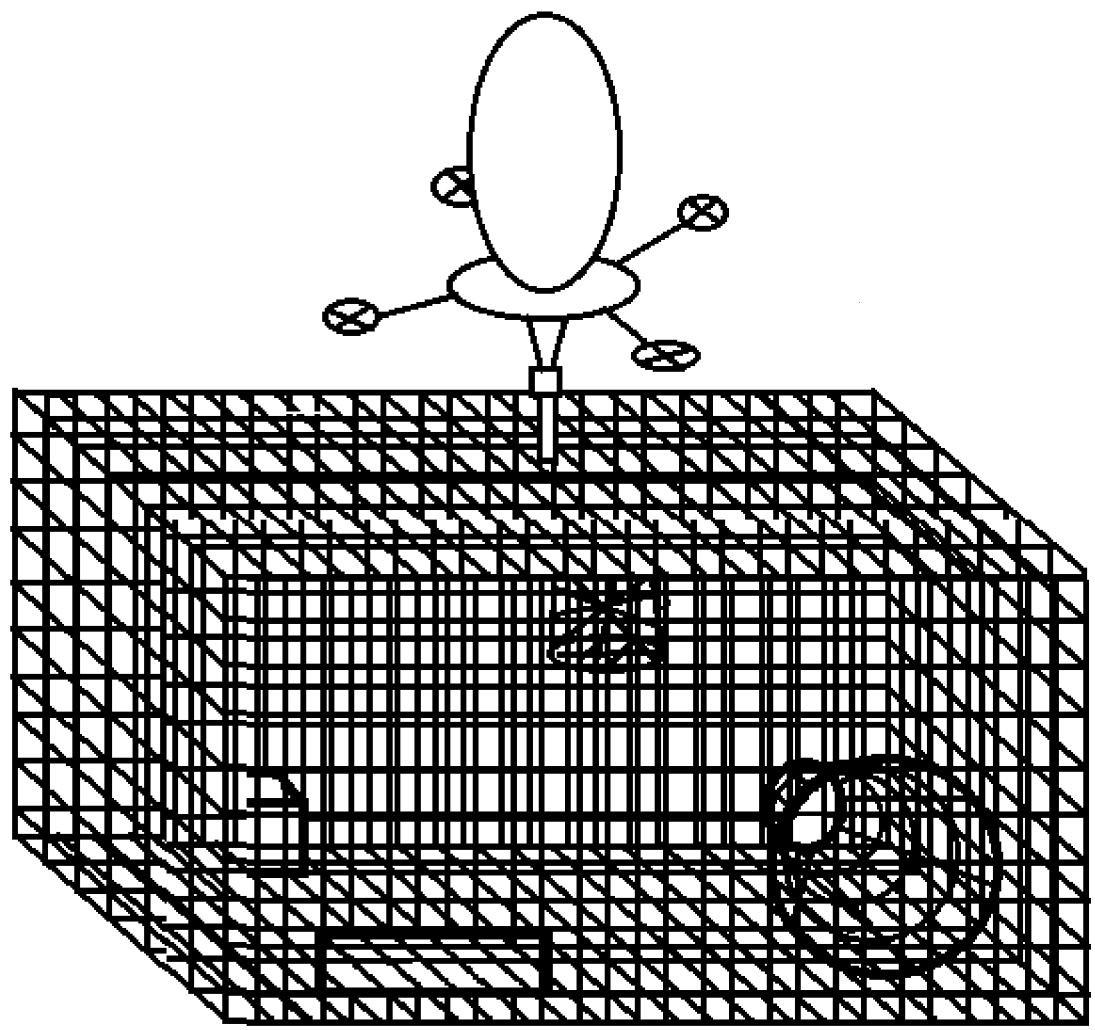
FIG. 4 is a perspective view of an embodiment of a submersible drone attaching to an embodiment of a trap in accordance with this disclosure and inflating, the trap shown having a state sensor and/or a transmission system.

In accordance with at least one aspect of this disclosure, referring to FIGS. 3 and 4, a submersible drone is shown schematically. The submersible drone can include any suitable propulsion system, ballast system, and/or frame (e.g., similar to above described embodiments). The submersible drone can include a frame configured to attached to or grab at least one underwater item (e.g., a cage), a propulsion system connected to the frame configured to provide propulsion, and a controller configured to control the propulsion system to autonomously pilot the drone. The drone can include any suitable components as disclosed above with respect to the embodiments of FIGS. 1A-2 and attached to any suitable structure (e.g., similar to a quad copter structure as shown and as appreciated by those having ordinary skill in the art in view of this disclosure). FIG. 3 is a perspective view of an embodiment of a submersible drone in accordance with this disclosure.

FIG. 4 is a schematic perspective view of an embodiment of a submersible drone attaching to an embodiment of a trap in accordance with this disclosure and inflating the ballast system thereof to produce a lifting force. While the embodiment of FIG. 4 is shown having an enlarging bladder, this is only illustrative of the inflation of the generic ballast system. The drone can include any suitable ballast system as disclosed above, for example. The trap can include a state sensor and/or a transmission system as disclosed herein.

In certain embodiments, the propulsion system can include at least one rotor connected to the frame. In certain embodiments, the propulsion system includes at least one propeller connected to the frame. In certain embodiments, the propulsion system can include three or more rotors positioned to provide 3-axis control.

In certain embodiments, the propulsion system can include at least one electric motor connected to each rotor and/or propellers, and at least one battery electrically connected to at least one of the at least one electric motor. The controller is configured to control each electric motor to control each rotor independent of the other rotors.

The controller can be configured to control a speed of each electric motor. At least one state sensor as described herein can be operatively disposed on the trap and in communication with the controller and configured to determine at least one state of the trap. In certain embodiments, the state sensor is configured to determine and amount, size, weight, and/or one or more attributes of one or more animals trapped within an underwater trap.

The controller can be configured to receive signals from the at least one sensor and to control the at least one electric motor as a function of the received signals from the at least one sensor. The drone can include a deployable buoy connected to the frame with a line. In certain embodiments, at least one location sensor can be attached to the buoy to deploy the location sensor to the surface.

The drone can include at least one communication system configured to send and/or receive signals from/to an underwater trap and/or to send and/or receive signals from a navigation system. The communication system can include at least one of a sonar system or an electromagnetic system.

The controller can be configured to process received sonar signals from an underwater navigation system and to determine a position of the drone underwater as a function at least one of range from one or more buoys of the underwater navigation system. The controller can be configured to triangulate the position of the drone from a received signal from a plurality of buoys of the underwater navigation system. The drone can be configured to locate an individual trap by locating a trap using a signal (e.g., an acoustic signal) from a trap.

In certain embodiments, the drone can include an inflatable ballast system configured to provide lifting force to the drone under water (e.g., to lift the trap). Any suitable configuration for the ballast system is contemplated herein. The ballast system can include one or more similar features as the ballast system for the drone cage as described above and hereinbelow, for example.

In accordance with at least one aspect of this disclosure, a system for harvesting crustaceans can include a crustacean trap having at least one of a state sensor and/or a propulsion system and/or a ballast system. In certain embodiments, a drone in accordance with this disclosure can be configured to retrofit on a traditional trap (e.g., a lobster trap).

In accordance with at least one aspect of this disclosure, a crustacean trap system can include at least one trap, and a submersible drone configured to attach to the at least one trap.

The trap can include a cage configured to trap one or more crustaceans, or can include any other suitable configuration. For example, the cage can be a lobster cage or any other suitable cage.

The submersible drone can include a propulsion system configured to provide propulsion to the cage when the submersible drone is attached to the cage. The submersible drone can include a controller that can be configured to control the propulsion system to autonomously pilot the drone to the at least one trap and/or to a set location underwater. The controller can include any suitable number of components and can be configured to perform any suitable function.

The trap can include at least one communication system configured to send and/or receive signals to/from the submersible drone. Any suitable system (e.g., radio, sonar) can be utilized.

Figure 5A:
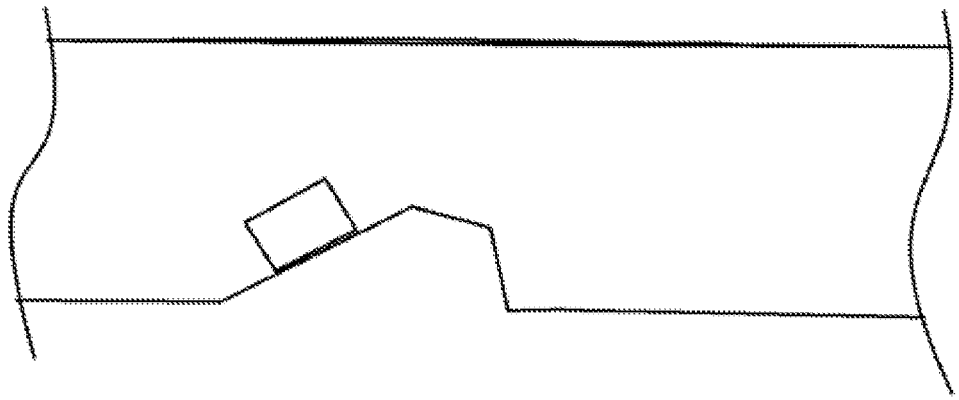
FIGS. 5A-5C show an animation of an embodiment of a drone trap in operation in accordance with this disclosure.
Figure 5B:
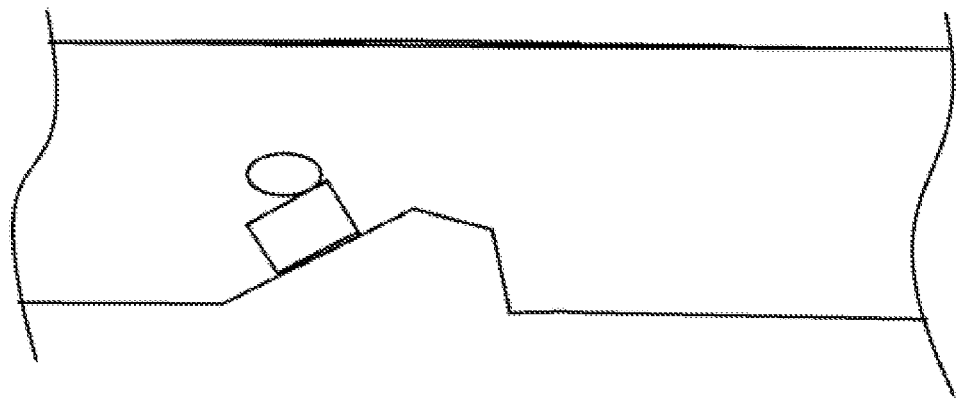
Figure 5C:
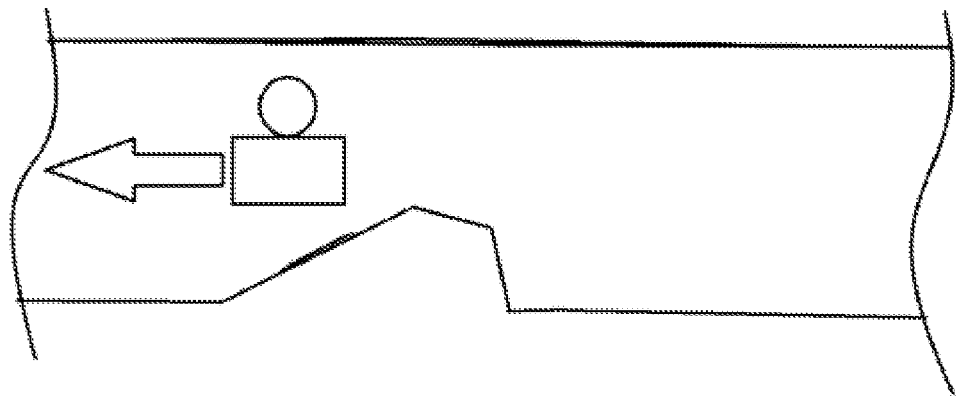
Figure 6A:
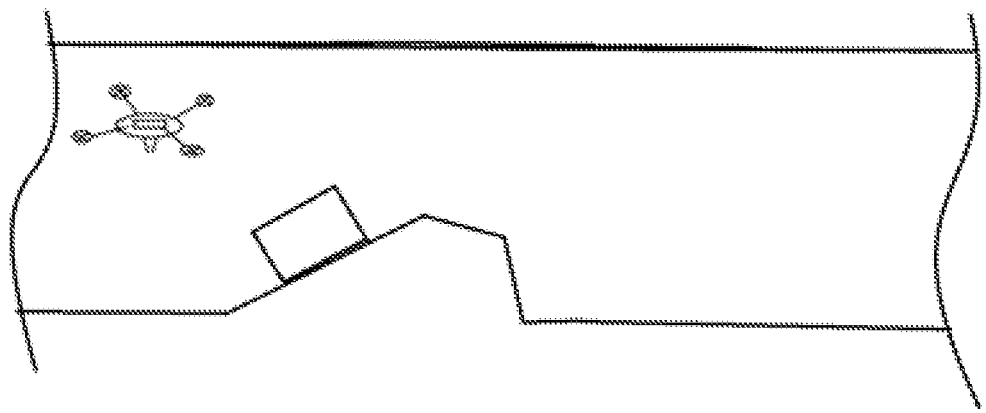
FIGS. 6A-6D show an animation of an embodiment of a submersible drone in operation in accordance with this disclosure.
Figure 6B:
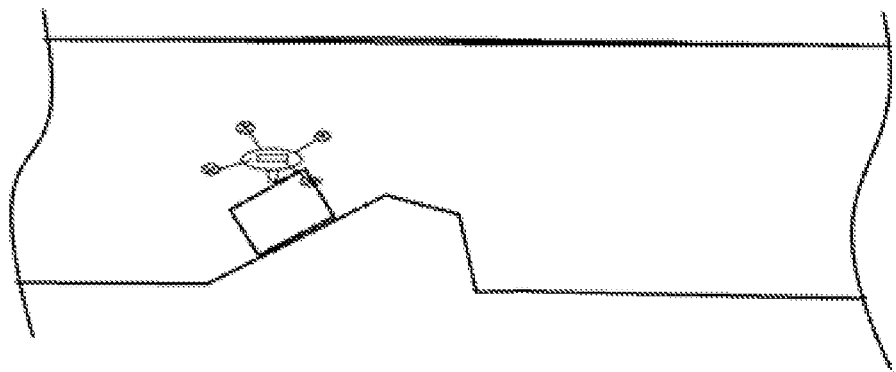
Figure 6C:
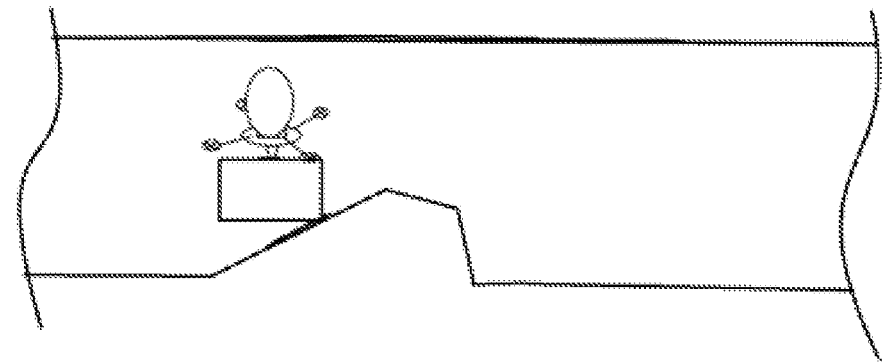
Figure 6D:
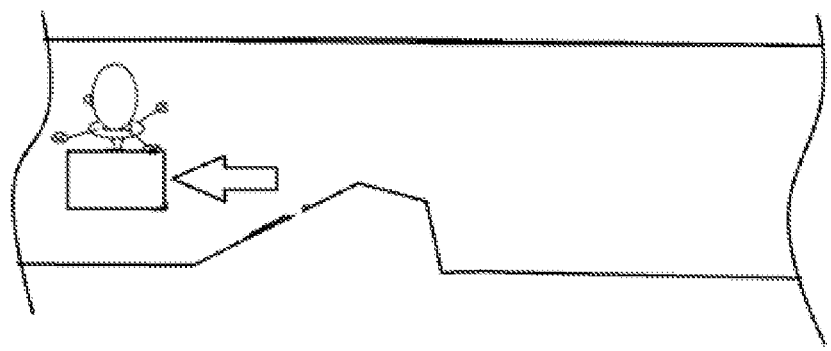

FIG. 5A-5C show an animation of an embodiment of a drone trap in operation in accordance with this disclosure. The drone can determine it is time to return to base and inflate the pressure vessel, thereby lifting the trap off of the surface and allowing the propulsion system to propel the trap to the base location using any suitable navigation system. The inflation of the pressure vessel is shown schematically for illustrative purposes.

FIG. 6A-6D show an animation of an embodiment of a submersible drone in operation in accordance with this disclosure. The drone can locate a trap in any suitable manner, latch on and inflate the ballast system to provide lifting force. The drone can then steer the trap back to the base station (e.g., a conveyer belt feeding into a receiving plant).

Figure 7A:
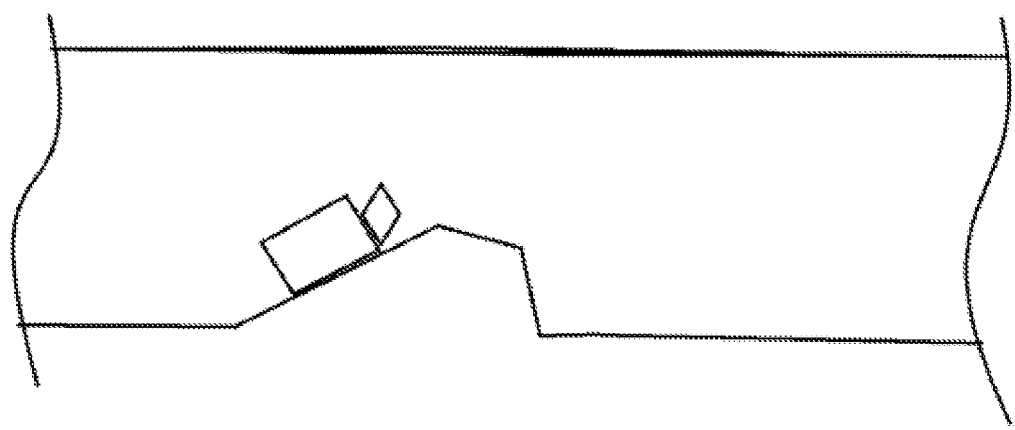
FIGS. 7A-7C show an animation of an embodiment of a drone trap in accordance with this disclosure.
Figure 7B:
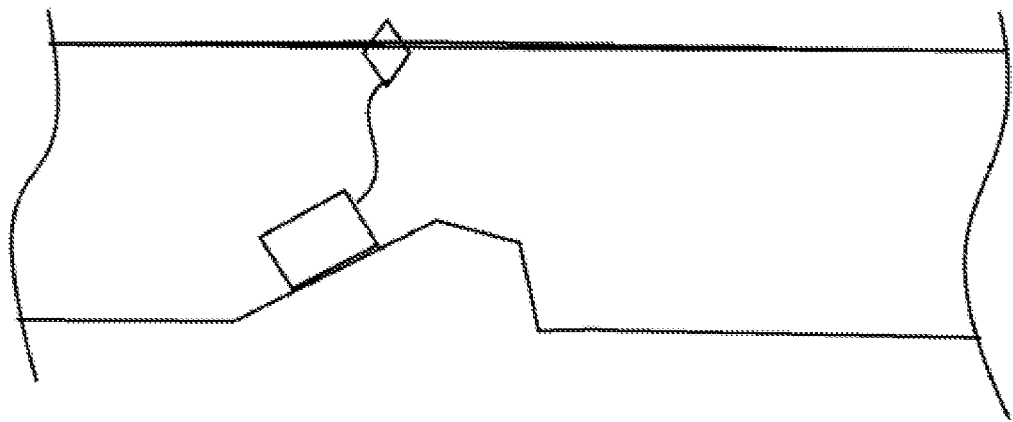
Figure 7C:
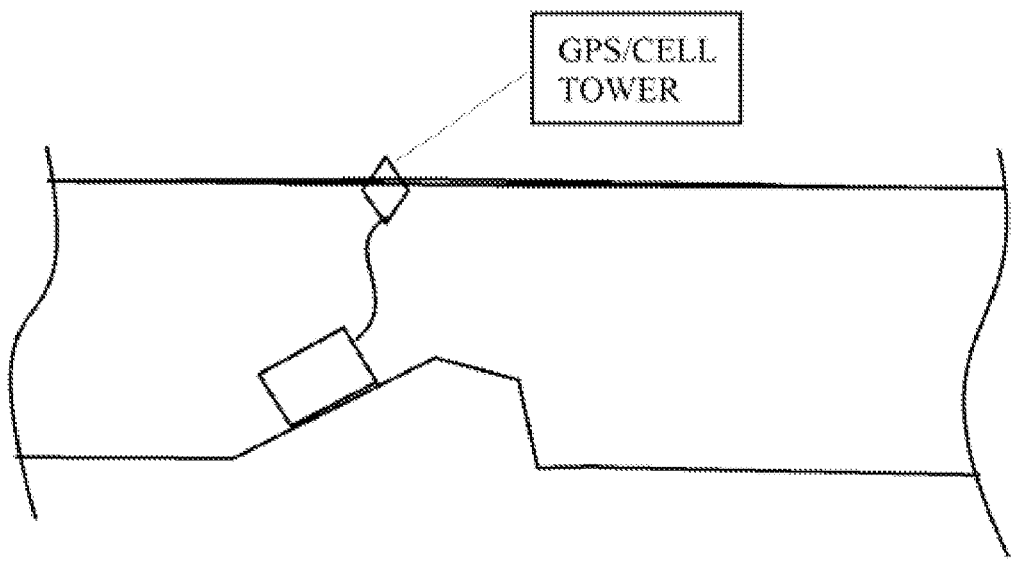

FIGS. 7A-7C show an animation of an embodiment of a drone trap in accordance with this disclosure showing the deployment of a buoy to allow the drone cage to do one or more of locate its position, send data to a wireless system, and/or send a distress signal. It is contemplated that the drone can deploy the buoy in a similar situation to that as shown in FIG. 9 due to interrogation from a boat instead of causing the entire device to float to the surface.

Figure 8:
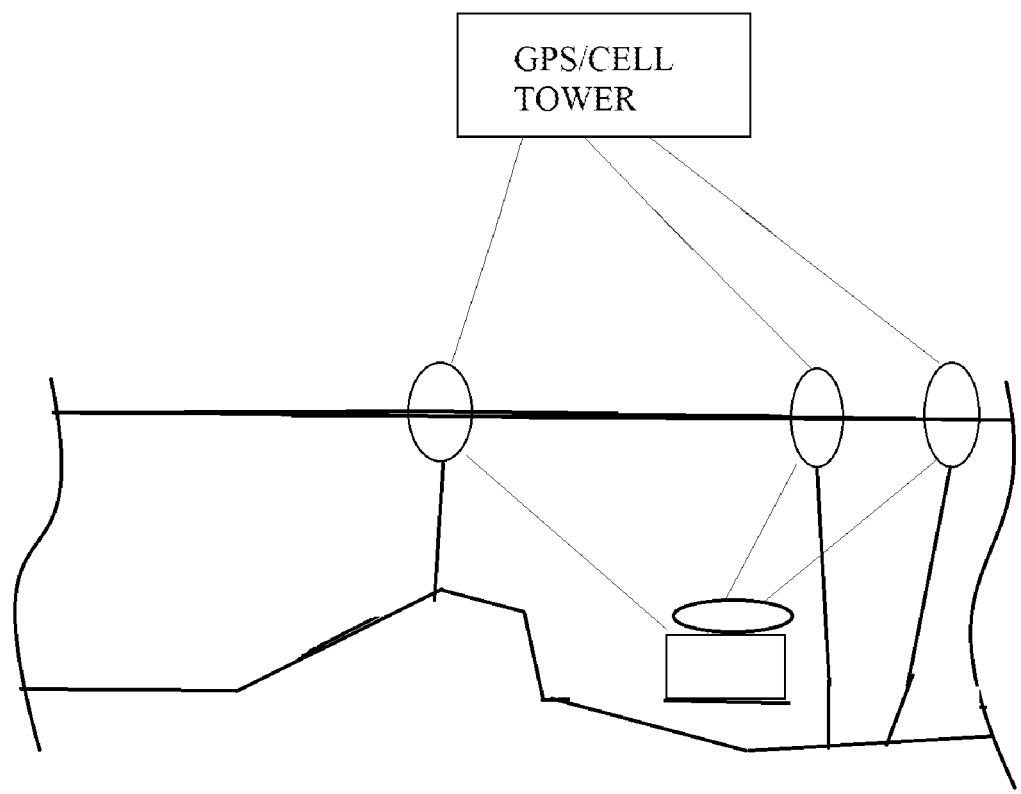
FIG. 8 is a schematic view of an embodiment of a navigation system in accordance with this disclosure.
Figure 9A:
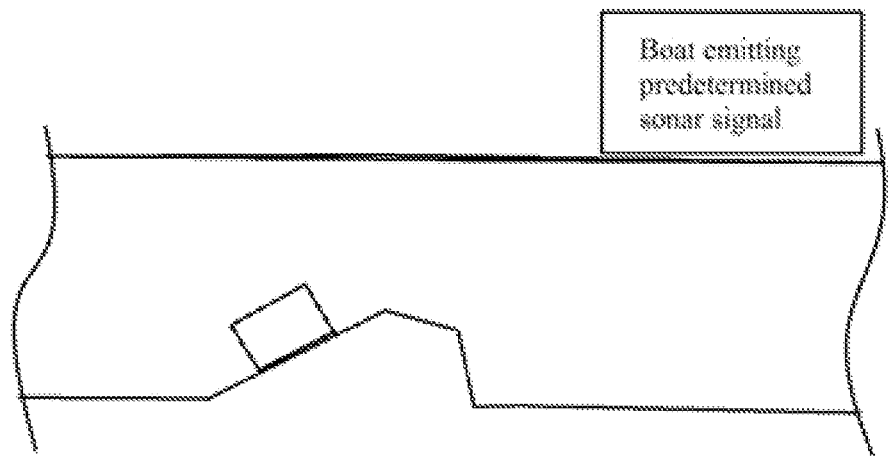
FIGS. 9A-9D show an animation of an embodiment of a drone trap in operation in accordance with this disclosure, shown responding to signal interrogation from a boat on the surface of the water.
Figure 9B:
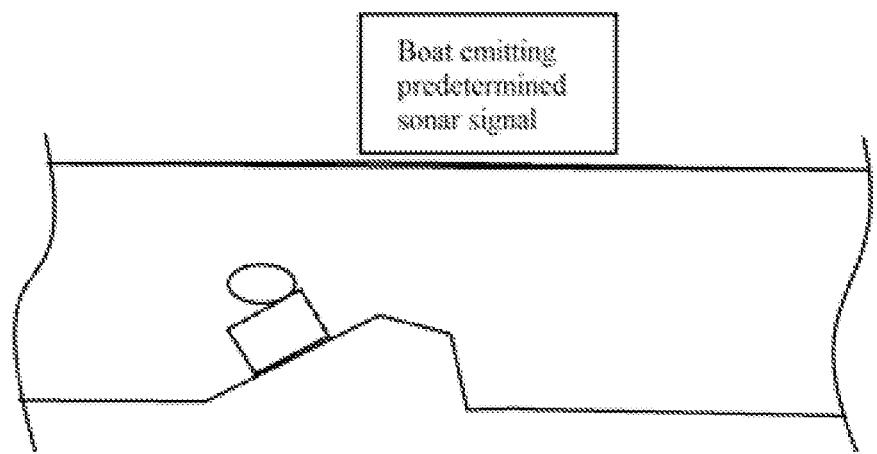
Figure 9C:
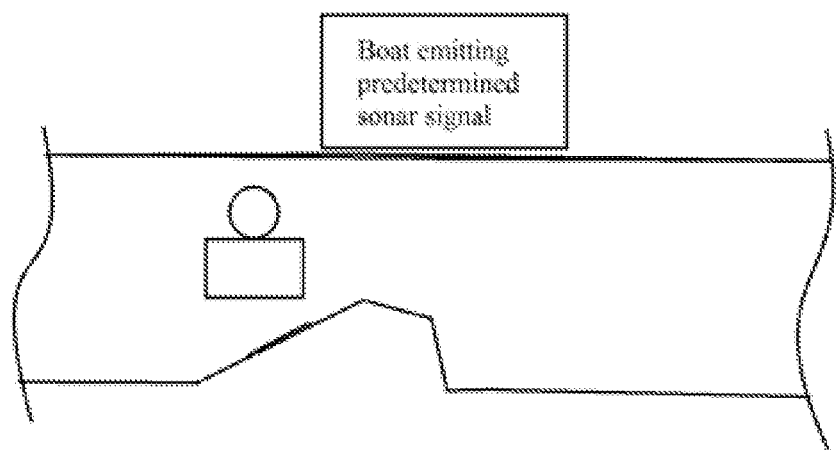
Figure 9D:
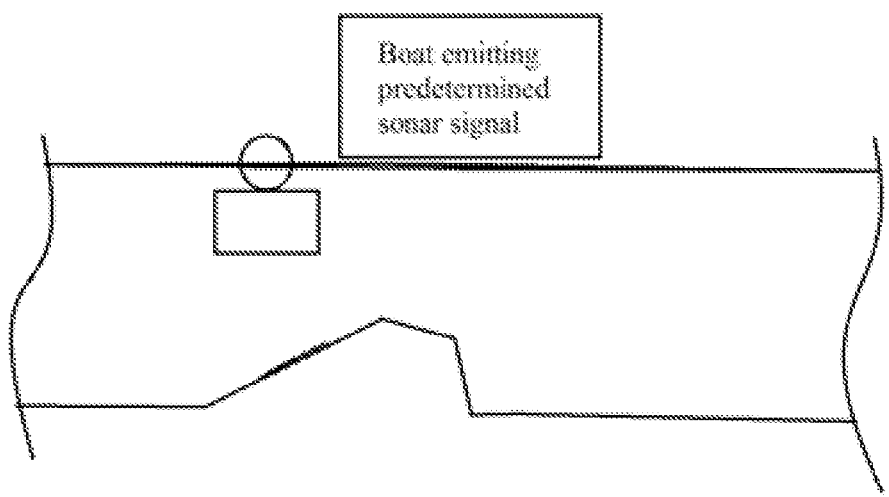

FIG. 8 is a schematic view of an embodiment of a navigation system in accordance with this disclosure. Any suitable network and/or navigation system is contemplated herein.

In accordance with at least one aspect of this disclosure, a navigation system 800 (e.g., as shown in FIG. 8) for an underwater drone\trap (e.g., a trap as disclosed hereinabove, a drone as disclosed hereinabove), can include one or more buoys 801 placed in a body of water within communication range of a wireless positioning system 803 (e.g., a cell tower, GPS) such that the one more buoys 801 are configured to determine location thereof and to relay location information to an underwater drone by broadcasting a sonar signal to create an underwater navigation network. One or more underwater drones\traps can include a sonar transmitter or electromagnetic transmitter for acting as a node in the underwater navigation network. The underwater navigation network can also be configured to handle any suitable type of data (e.g., using sonar data signals any associated systems as appreciated by those having ordinary skill in the art).

As shown in FIGS. 9A-9D, an embodiment of a drone trap in operation in accordance with this disclosure can be configured to responding to signal interrogation from a boat on the surface of the water to inflate a ballast and rise to the surface. This can prevent the possibility of theft of a trap and loss of a trap. For example, the boat can geo tag general areas where a trap is placed and can cause all traps in range to rise to the surface. Alternatively, only traps that have been down long enough or are sufficiently full (based on data from the one or more state sensors and/or as determined by the controller as described above) may be configured to inflate their ballasts and rise. Any other suitable system and/or control scheme is contemplated herein.

In accordance with at least one aspect of this disclosure, a method can include harvesting crustaceans using at least one drone or at least one drone crustacean trap. Harvesting can include autonomously harvesting crustaceans, for example (by using one or more autonomous drones or drone traps as disclosed herein). The method can include receiving the at least one drone or a drone crustacean trap at a water side land based location for processing of the drone or drone crustacean trap.

In certain embodiments, a factory for processing one or more drones and/or traps in accordance with this disclosure can include a conveyor (e.g., a moving belt) partially submerged in a body of water (e.g., the ocean). The conveyor can include a signal emitter (e.g., an acoustic emitter) to allow a drone and/or trap as disclosed herein to navigate to the conveyor under water, where the drone/trap can be configured to land and be taken up by the conveyor into the factory.

For example, an autonomous drone trap or drone carrying a trap can navigate to a predetermined pick up location. The location can be a factory intake, for example. The trap can be placed on an underwater conveyor belt and lifted into the factory and processed. The factory can manually or autonomously open the cage, remove the crustaceans, and sort the crustaceans into those to be kept and those to be returned. The factory can include equipment to charge the one or more batteries and/or recharge gas to the gas supply. The factory can send the drone and/or trap back out when ready (e.g., via an outbound conveyor belt to place the drone and/or cage into the water. Captured animals that are not to be kept can be sent out in batches (e.g., in a separate batch drop drone), or placed in the water at any suitable location in any suitable manner.

A system for automatically harvesting crustaceans in accordance with this disclosure can include a factory as disclosed herein and a conveyor for lifting drones out of the water and into the factory or to a shipment vehicle to be shipped to the factory. The system can include one or more drones and/or traps as disclosed above.

Certain embodiments allow for a continuous process that can be controlled completely. Certain embodiments completely eliminate the need for boats in lobstering and crabbing, which can dramatically reduce the cost of such products. Also, certain embodiments are far more energy efficient and do not produce pollution in the water. Entire fishing industries can be consolidated to high efficiency factories with little waste and no pollution, and the size of the annual catch can be specifically controlled to prevent over-fishing. Dirty and expensive boats can be completely eliminated from lobstering and crabbing.

Certain embodiments can allow more efficient crustacean fishing because embodiments can include state sensors and controllers that can cause automatic repositioning of cages. For example, if a cage is sitting at a bad angle, it can lift off and find another spot. If the cage does not sense a fast enough ingress of crustaceans at a particular location, it can lift off and try another spot. Any suitable smart control logic is contemplated herein and can be implemented in any suitable module (e.g., on a controller as disclosed above).

Embodiments can be utilized with coastal fishing (e.g., for Maine lobster) or for deep sea fishing (e.g., for Alaskan crab). In deep sea fishing, it is contemplated that the drones/traps can travel to an at-sea base station if it is impractical or impossible for the traps to travel to a suitable land based location. The at-sea base station can include an optionally submersible structure that is permanently anchored at a particular location that can collect traps and/or drones. A boat can travel to the at-sea base station and collect the cages and/or drones for processing on the boat or on shore.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any and all components utilized herein can be configured and/or packaged for use at extremely high pressures and/or low temperatures under water (e.g., at the ocean floor) as appreciated by those having ordinary skill in the art.

As appreciated by those having ordinary skill in the art, any suitable combination of embodiments and/or one or more portions thereof described above is contemplated herein.

The apparatuses, methods, and systems of the present disclosure, as described above and shown in the drawings, provide for improvements over the art. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A submersible drone, comprising:
   a cage configured to trap one or more animals underwater; and
   a propulsion system connected to the cage and configured to provide propulsion to the cage, wherein the submersible drone is configured to be submerged to and sit on a bottom of a body of water to trap the one or more animals from the bottom of the body of water.

2. The submersible drone of claim 1, further including at least one controller configured to control the propulsion system to autonomously pilot the submersible drone.

3. The submersible drone of claim 2, wherein the propulsion system includes at least one rotor connected to the cage.

4. The submersible drone of claim 2, wherein the propulsion system includes at least one propeller connected to the cage.

5. The submersible drone of claim 4, wherein the propulsion system includes three or more rotors positioned to provide 3-axis control configured to at least provide directional and orientation control in motion.

6. The submersible drone of claim 5, wherein the propulsion system includes:
   at least one electric motor connected to each rotor and/or each propeller;
   at least one battery electrically connected to the at least one electric motor; and
   wherein the controller is operatively connected to each electric motor to control each rotor and/or propeller.

7. The submersible drone of claim 4, wherein a thrust vector is moveable relative to the cage, wherein the controller is configured to control a direction of the thrust vector of to provide a directional control of the submersible drone.

8. The submersible drone of claim 1, further including a ballast system connected to the cage and configured to provide lifting force to the submersible drone under water.

9. The submersible drone of claim 8, further including a controller configured to control the propulsion system and the ballast system to autonomously pilot the submersible drone.

10. The submersible drone of claim 9, wherein the ballast system includes:
   at least one pressure vessel;
   at least one gas supply; and
   at least one valve operatively connected to the controller and configured to permit gas from the gas supply into the at least one pressure vessel in an open position, and to prevent gas from the gas supply from entering the at least one pressure vessel in a closed position.

11. The submersible drone of claim 10, wherein the controller is configured to control the at least one valve to allow enough gas into the at least one pressure vessel to provide a predetermined lifting force.

12. The submersible drone of claim 11, wherein the controller is configured to control the at least one valve to allow enough gas to create equal lifting force to the weight of the submersible drone to create a zero weight condition under water or to create greater lifting force then the weight of the submersible drone to cause the submersible drone to rise.

13. The submersible drone of claim 12, further comprising a compressor configured to recompress gas in the pressure vessel back into the gas supply.

14. The submersible drone of claim 9, further comprising at least one state sensor operatively disposed on the submersible drone in communication with the controller and configured to determine at least one state of the submersible drone.

15. The submersible drone of claim 14, wherein the at least one state sensor includes at least one of a position sensor, a speed sensor, an attitude sensor, a roll sensor, a yaw sensor, a pitch sensor, an altimeter, or an accelerometer.

16. The submersible drone of claim 14, wherein the controller is configured to receive signals from the at least one state sensor and to control the propulsion system and/or the ballast system a function of the received signals from the at least one state sensor.

17. The submersible drone of claim 16, wherein the controller is configured to reposition the submersible drone based on the received signals from the at least one state sensor.

18. A method, comprising:
   harvesting animals from a bottom of a body of water using at least one submersible drone; and
   receiving the at least one drone at a water side land based location for processing of the submersible drone.

19. The method of claim 18, wherein receiving the at least one submersible drone includes receiving the submersible drone at a conveyer belt.

20. The method of claim 19, further comprising emptying a trap of the submersible drone, recharging a battery of the submersible drone, and redeploying the submersible drone to the body of water.

* * * * *